United States Patent [19]

Butler, Jr.

[11] 4,135,404
[45] Jan. 23, 1979

[54] GAS TANK MEASURING AND CLOSURE DEVICE

[76] Inventor: Edward J. Butler, Jr., Butler Chevrolet Motors, 452 Broad St., New London, Conn. 06320

[21] Appl. No.: 875,748

[22] Filed: Feb. 6, 1978

[51] Int. Cl.² ............................................. G01F 19/00
[52] U.S. Cl. ................................. 73/426; 220/82 R; 220/86 R; 222/158
[58] Field of Search .................. 73/426, 427, 428; 222/158, 159; 220/86 R, 82 R

[56] References Cited

U.S. PATENT DOCUMENTS

| 202,268 | 4/1878 | Keller | 222/158 |
|---|---|---|---|
| 1,780,875 | 11/1930 | Gordon | 141/381 |
| 2,108,692 | 2/1938 | Pieck | 221/147 |
| 2,631,608 | 3/1953 | Rosenberg | 137/576 |
| 2,712,396 | 7/1955 | Mowat | 220/85 |
| 2,921,707 | 1/1960 | Sloan | 73/427 |
| 2,998,893 | 9/1961 | Thomas | 215/37 |
| 3,581,927 | 6/1971 | Langdon | 215/43 |
| 3,720,231 | 3/1973 | Avero | 220/86 R |

*Primary Examiner*—S. Clement Swisher
*Assistant Examiner*—Denis E. Corr
*Attorney, Agent, or Firm*—Salter & Michaelson

[57] ABSTRACT

A gas cap includes an integral container portion downwardly extending therefrom and adapted to measure the proper amount of oil to be added to the fuel tank of a gasoline two-cycle IC engine. The cap portion of the device is adapted to be hand-held both in closing the tank and in manipulating the tubular container portions thereof for measurement of the oil.

5 Claims, 3 Drawing Figures

GAS TANK MEASURING AND CLOSURE DEVICE

BACKGROUND AND OBJECTS OF THE INVENTION

This invention relates to a device for use in engines of the type requiring a fuel additive. More particularly, the invention relates to a device for alternatively closing the gasoline tank of a two-cycle IC engine and for measuring the amount of lubricating oil additive required to be mixed with fuel newly added to the tank. Engines of this nature are in wide spread use; one such use being the power plant for MOPED vehicles which are now deservedly winning acceptance and popularity in this country.

With such vehicles, it is essential that special oils be added to the fuel tank each time gasoline is added so that the proper mixture of oil and gasoline is achieved so as to insure proper lubrication for the particular engine. Generally such oils are added in predetermined specific fuel-oil ratios, i.e., in a range between 50/1 to 100/1, although other ratios, depending upon the characteristics of the particular engine and oil, may be utilized. For instance, when using a 50 to 1 fuel-oil ratio, adding 0.4 gallons of gasoline to the fuel tank requires the subsequent admixture of one ounce of oil thereto.

Various solutions have been proposed to insure that the proper fuel-oil admixture procedure takes place when refueling two-cycle engines. Among those are the constructions suggested in U.S. Pat. Nos. 2,631,608 and 2,712,396. In this regard the '608 patent utilizes a dual tube construction provided with registerable openings such that when oil is poured into one of the tubes and thereafter rotated, the oil within that tube is permitted to enter the container for eventual mixing with the gasoline contained therein. The '396 patent provides indicator strips 68 which are utilized to determine the volume of gasoline added to the container so that the proper amount of added oil may be thereafter added. Other patents of interest are U.S. Pat. Nos. 1,780,875; 2,108,692; 2,998,893; and 3,581,927 each of which shows a cap with an interior cylinder that is utilized for measurement purposes, although their use in the environment of the present invention, that is, a combination closure and measuring device for a gasoline tank is neither suggested nor believed appropriate. The above discussion and recitation of the above patents constitutes applicant's Prior Art Disclosure and in such regard, a copy of each such patent is enclosed with this application.

In spite of the above structures, there remains a need for a device which can assure the proper ratio admixture of oil and gasoline in two-cycle engines. It is accordingly a primary object of this invention to provide a device of the above-described type which is of straightforward construction and presents no operational difficulty for those utilizing engines requiring fuel additives.

A still further object of the present invention is the provision of a device of the above-indicated type which presents neither a cleanliness or storage problem.

These and other objects of the present invention are accomplished by the provision of a device which alternatively functions as a closure for a gasoline tank and a measurement device for additives such as lubricating oils to be admixed therewith. The device includes a cap portion adapted to function as a closure in the fill opening of a gasoline tank and from which a hollow tubular member outwardly extends into the gasoline tank when the device is used as a closure and alternatively in an upright position when used as a measuring device so as to gauge the correct amounts of oil to be added to the fuel tank. The tubular member is additionally provided with aligned indicia which delineates, i.e., measures the amount of oil to be added for the amount of gasoline indicated thereby in order that a correct oil/gasoline admixture be provided to the engine.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
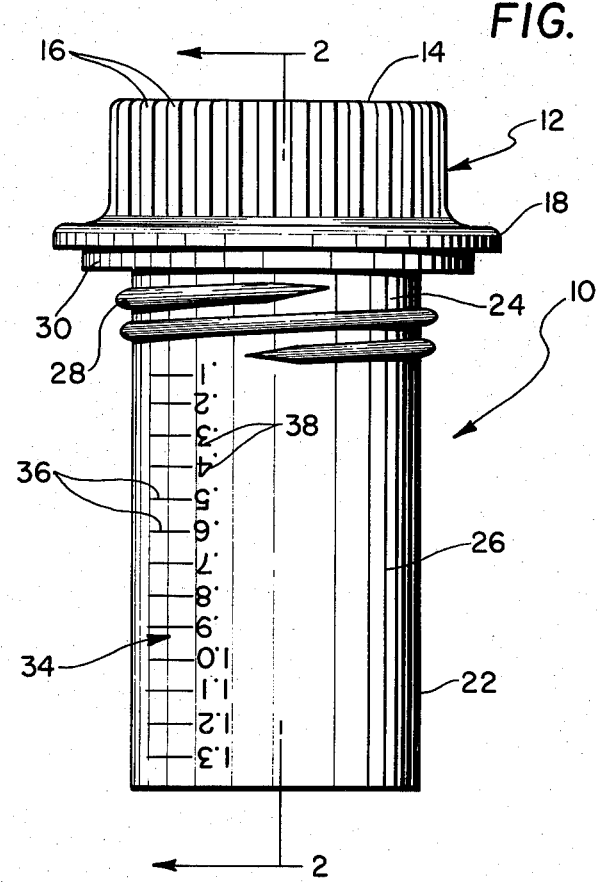
FIG. 1 is a side elevational view of a device constructed in accordance with the present invention.

The drawing shows one constructional embodiment of the invention wherein the device 10 thereof functions as a screw-on type gas cap. The device 10 accordingly includes a cap member 12 having a tubular top portion 14 provided with peripheral indentations 16 such that the cap may be easily grasped in one's hand or otherwise manipulated. The cap further includes a radially outwardly extending flange 18 at the lower portion thereof and a boss or extension 20 further downwardly extending from said flange. The boss or extension 20 is adapted to receive a hollow tubular member of cylinder 22. The upper end 24 of the cylinder 22 frictionally engages the outer surface of the boss 20 or is otherwise attached thereto to form a unitary construction. Alternatively, the cylinder and cap may be integrally formed.

The remaining portions of the cylinder 22 form a container 26. Furthermore, the upper cylinder portion 24 is provided with a plurality of threads 28 and a sealing member or gasket 30 such that the device 10 may be screw engaged with an upstanding fill opening defining collar of a gasoline tank (not shown) such that it may be appropriately and securely attached thereto so as to prevent the leakage of fuel therefrom. It should also be pointed out that although the screw-on type of closure device depicted on the drawing is the preferred form of the invention, that other type connection means between the device and the tank may be utilized such as the known friction push-in type (not shown).

Figure 2:
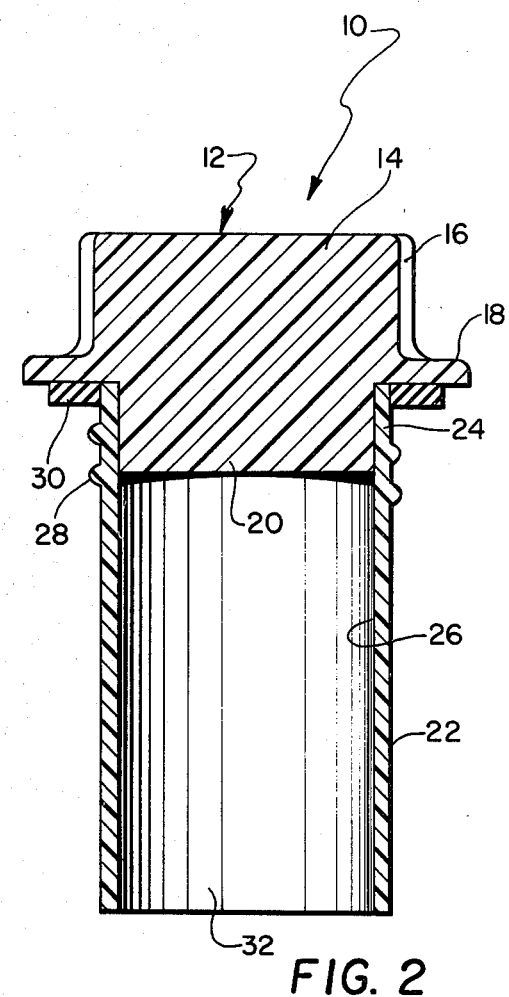
FIG. 2 is a side sectional view thereof taken along the line 2—2 of FIG. 1.
Figure 3:
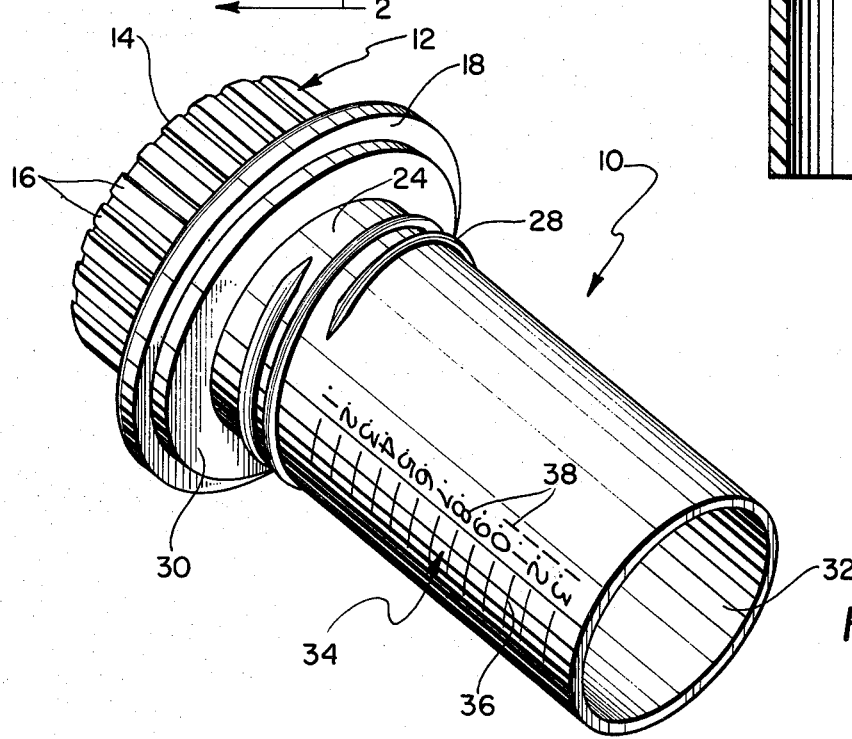
FIG. 3 is a perspective view thereof.

The tubular member 22 is preferably formed from a material which is at least translucent such as oil and gasoline resistant plastic materials including polyolefins and the co-polymers thereof such that when the device 10 is used in its alternate measurement capacity, that is, in a position inverted from that shown in FIGS. 1 and 2 of the drawing, amounts of oil or other additive may be easily measured by the device. In such alternate use position, the upper cap portion 14 is utilized as a grasping and manipulating member such that the above indicated inversion of the device to a position where the cap is lowermost and the open portion 32 of the container 26 uppermost is easily accomplished. In this disposition, oil may be poured into the container 26 to the desired level or volume thereof as indicated by indicia 34 provided on the outer surface thereof. Such indicia includes a plurality of spaced lines 36 as well as a plurality of aligned numerals 38 adjacent thereto. The numerals are also arranged so as to indicate increasingly larger volume amounts indicated at the end of the container proximal to the cap 14 towards the opening 32 of the container. The numerals are also preferably disposed in upright positioning in such alignment so that they may be correctly viewed right side up in the inverted position of the device 10. Also, instead of directly indicating the volume of oil measured by the adjacent lines 36, the numerals are indicative of the amount of unlubricated gasoline that has been newly added to the gasoline tank inasmuch as such gasoline is normally filled from easily metered sources such as a gas pump or gasoline storage vessel. On the other hand the delineating lines adjacent such numerals serve to measure the amount of oil within the container which is suitable for that amount of gasoline; the height of the scribe marks 34 having been so positioned on the container to correspond with the desired amount of oil to be added for the specific amount of gasoline added to the fuel tank. Thus for a 50-1 fuel/oil ratio, when the user adds 0.4 gallons of gasoline to the tank, then the amount of oil delineated by the scribe mark adjacent the 0.4 numeral will be approximately 1 ounce. Naturally, the actual amount of oil or other additive delineated by the scribe marks may vary depending on the desired fuel/oil admixture as well as particular size and construction of the container portion 26 and device 10.

It is also contemplated that the spaced scribe lines 36 and the numerals 38 associated therewith may be removed from the container or otherwise not directly referred to when utilizing the device. In such cases, the entire container could function as the measured amount of oil to be added to the tank for a specific amount of gasoline added thereto. Thus the entire container could be filled with oil that will be poured into the tank without regard to indicia since the open top of the container would then function as the measuring means.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In combination with the fuel tank of a vehicle having an engine requiring an additive to the fuel, portions of said tank defining a fill opening therein, a device adapted for alternative closure and measuring use positions with said tank, said device including a cap member adapted to engage said tank portions so as to close said opening therein and further having an upper portion adapted to extend outwardly of said tank when said device is disposed in said closure position, an elongated hollow tubular member downwardly projecting from a lower surface of said cap member when said device is disposed in said closure use position, said tubular member having a container portion adapted to receive and measure said additive in proportion to fuel being added when said device is removed from said tank in its measuring use position, and said cap member forming a holding member for said device for enabling a user thereof to hand manipulate said device in both of said alternative use positions thereof, said tubular member being a cylinder, said upper cap portion being of cylindrical shape having an indented outer peripheral surface, said device including a flange radially extending from said cap, said flange including means for sealingly engaging said portions of said tank defining said opening, outer portions of said cylinder proximal to said cap including thread means for connecting said device to said tank and lower portions of said cap when said device is in its closure use position extending into said cylinder so as to space said cylinder container portion from other portions of said cap.

2. The device of claim 1, the container portion of said tubular member being at least translucent and having separate volume measurement indicia formed thereon, said indicia longitudinally aligned along the major extent of the container portion of said tubular member and delineating the amount of additive to be added to said tank corresponding to the amount of gasoline added to said tank and indicated by said indicia.

3. The device of claim 2, said indicia including spaced numerals arranged in order of increasing value from said lower surface of said cap when said cap is in said closure use position and representing the amount of gasoline added to said tank.

4. The device of claim 3, said numerals being right side up when said tubular member is disposed in its upright measuring use position.

5. The device of claim 1, said engine being a two-cycle IC gasoline engine wherein said additive is a lubricating oil.

* * * * *